(12) United States Patent
Lipparini et al.

(10) Patent No.: US 12,400,094 B1
(45) Date of Patent: Aug. 26, 2025

(54) MOBILE COMPUTER WITH SCAN ENGINE AND NFC BOOSTER COIL

(71) Applicant: Datalogic IP Tech S.r.l., Calderara di Reno (IT)

(72) Inventors: Valerio Lipparini, Anzola dell'Emilia (IT); Daniele Fiorini, Casalecchio di Reno (IT); Marco D'Ulisse, Bologna (IT); Alessandro Chiarini, Castel Maggiore (IT)

(73) Assignee: Datalogic IP Tech S.r.l., Calderara di Reno (IT)

( * ) Notice: Subject to any disclaimer, the term of this patent is extended or adjusted under 35 U.S.C. 154(b) by 11 days.

(21) Appl. No.: 18/586,333

(22) Filed: Feb. 23, 2024

(51) Int. Cl.
*G06K 7/10* (2006.01)
*G06K 7/14* (2006.01)

(52) U.S. Cl.
CPC ....... *G06K 7/1413* (2013.01); *G06K 7/10297* (2013.01)

(58) Field of Classification Search
CPC .......................... G06K 7/1413; G06K 7/10297
USPC ....................................................... 235/451
See application file for complete search history.

(56) References Cited

U.S. PATENT DOCUMENTS

2014/0065948 A1\* 3/2014 Huang ................. H02J 7/0045
361/679.01

\* cited by examiner

*Primary Examiner* — Toan C Ly
(74) *Attorney, Agent, or Firm* — Foley & Lardner LLP

(57) ABSTRACT

A mobile barcode reader may include a housing having a defined exit window, a scan engine, a primary NFC antenna, and a secondary NFC antenna. The scan engine may be configured to read barcodes and positioned within a front portion of the housing with one or more imagers having a field-of-view extending out of the exit window. The primary NFC antenna may be disposed in a first plane extending in a longitudinal direction of the housing, the primary NFC antenna operably coupled with electronics of the mobile barcode reader to facilitate NFC reading. The secondary NFC antenna may be disposed proximate the front portion and extending in a second plane transverse to the longitudinal of the housing, and configured as a boosting antenna for the primary NFC antenna without being electrically coupled with the electronics of the mobile barcode reader. Related methods of operating and manufacturing are also disclosed.

20 Claims, 15 Drawing Sheets

500A

| NFC CARDS | Card Front Placement NO Booster (read range in mm) | Card Front Placement Booster (read range in mm) |
|---|---|---|
| NFC Type1 14443-3A NFCA Topaz | 5 | 13 |
| NFC Type2 14443-3A NFCA Mifare Ultralight | 2 | 21 |
| NFC Type3 JIS 6319-4 NFCF Felica Sony | 7 | 22 |
| NFC Type4 14443-4 NFCA | 5 | 17 |
| NFC Type4 14443-4 NFCA 8KB Memory | 2 | 13 |
| NFC Type4 14443-4 NFCA 32KB memory | 3 | 13 |
| NFC Type4 14443-4 NFCB | 0,3 | 10 |
| NFC Type5 15693 NFCV ICODE SLIX | 10 | 31 |

| NFC CARDS | Card Rear placement witout booster coil (read range in mm) | Card Rear placement with booster coil (read range in mm) |
|---|---|---|
| NFC Type1 14443-3A NFCA Topaz | 37 | 32 |
| NFC Type2 14443-3A NFCA Mifare Ultralight | 40 | 41 |
| NFC Type3 JIS 6319-4 NFCF Felica Sony | 38 | 40 |
| NFC Type4 14443-4 NFCA | 36 | 36 |
| NFC Type4 14443-4 NFCA 8KB Memory | 34 | 34 |
| NFC Type4 14443-4 NFCA 32KB memory | 35 | 35 |
| NFC Type4 14443-4 NFCB | 30 | 30 |
| NFC Type5 15693 NFCV ICODE SLIX | 50 | 55 |

FIG. 5B

MOBILE COMPUTER WITH SCAN ENGINE AND NFC BOOSTER COIL

TECHNICAL FIELD

The present disclosure relates generally to mobile computers having barcode scanning capabilities, and more particularly, to mobile computers with barcode reading and near-field communication for card reading and payment processing.

BACKGROUND

Mobile computers are often used for assisting workers with scanning machine-readable indicia (e.g., barcodes, QR codes, etc.) in performing a variety of tasks. Such tasks often involve reading machine-readable indicia for taking inventory in warehouses and retail stores, reading identifiers of products (e.g., performing rental vehicle checkout at airports, checking out customers in retail environments), and other routine tasks in which the workers are to use the mobile computers to perform the scanning of the machine-readable indicia. Some mobile computers have been equipped with a near-field communication (NFC) antenna that enables reading cards, such as payment cards (e.g., credit cards, debit cards, etc.), that are placed in proximity to the antenna. Conventionally, these NFC antennas have been disposed on the battery pack or on a back top side of the mobile computer, which allows for card reading close to the back side of the mobile computer. The inventors, however, have appreciated that conventional devices do not have an optimal user experience in the case of a credit card payment application where the user may prefer to place the credit card in the front/top side of the device.

BRIEF SUMMARY

A mobile barcode reader, comprises a housing having a defined exit window; a scan engine positioned within a front portion of the housing with one or more imagers having a field-of-view extending out of the exit window, the scan engine configured to read barcodes; a primary NFC antenna disposed in a first plane extending in a longitudinal direction of the housing, the primary NFC antenna operably coupled with electronics of the mobile barcode reader to facilitate NFC reading; and a secondary NFC antenna disposed proximate the front portion and extending in a second plane that is transverse to the longitudinal of the housing, the secondary NFC antenna configured as a boosting antenna for the primary NFC antenna without being electrically coupled with the electronics of the mobile barcode reader.

A method of manufacturing a mobile barcode reader, the method comprising: forming a housing having a defined exit window; disposing a scan engine within a front portion of the housing with one or more imagers having a field-of-view extending out of the exit window, the scan engine configured to read barcodes; disposing a primary NFC antenna in a first plane extending in a longitudinal direction of the housing, the primary NFC antenna operably coupled with electronics of the mobile barcode reader to facilitate NFC reading; and disposing a secondary NFC antenna disposed proximate the front portion and extending in a second plane that is transverse to the longitudinal of the housing, the secondary NFC antenna configured as a boosting antenna for the primary NFC antenna without being electrically coupled with the electronics of the mobile barcode reader.

A method of operating a mobile barcode reader, the method comprising: operating a scan engine positioned within a front portion of the housing with one or more imagers having a field-of-view extending out of an exit window of the mobile barcode reader, the scan engine configured to read barcodes; activating a primary NFC antenna disposed in a first plane extending in a longitudinal direction of the housing, the primary NFC antenna operably coupled with electronics of the mobile barcode reader to facilitate NFC reading; and activating a secondary NFC antenna disposed proximate the front portion and extending in a second plane that is transverse to the longitudinal of the housing, the secondary NFC antenna configured as a boosting antenna for the primary NFC antenna without being electrically coupled with the electronics of the mobile barcode reader.

BRIEF DESCRIPTION OF THE DRAWINGS

FIG. 5A is a table showing an exemplary read range for various NFC cards when placed in front of a mobile computer device under different configurations.

FIG. 5B is a table showing an exemplary read range for various NFC cards when placed in below the underside of a mobile computer device under different configurations.

DETAILED DESCRIPTION

Figure 1:
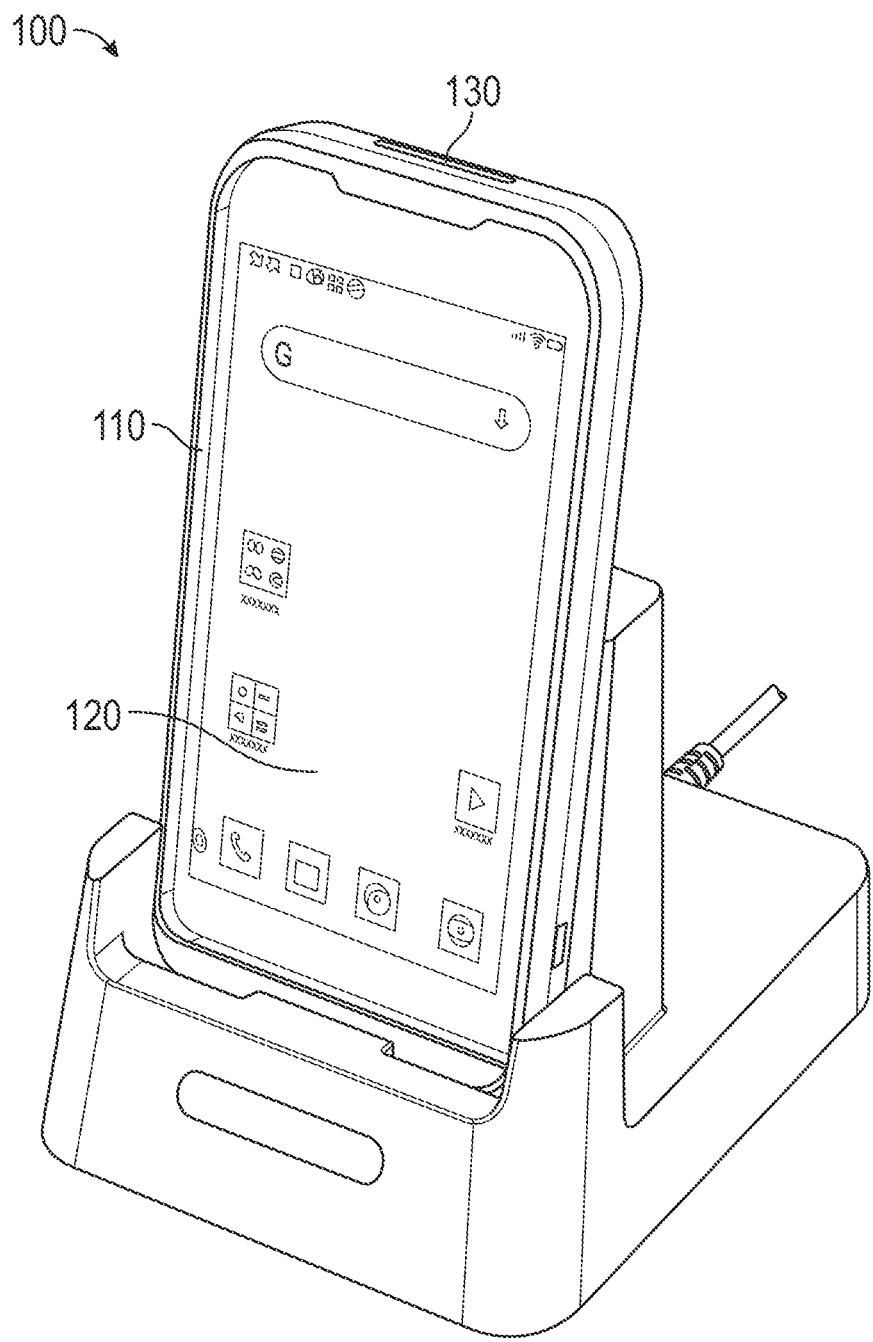
FIG. 1 is a mobile computer according to an embodiment of the disclosure.

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operably connected with each other, such as connected through a direct connection or through an indirect connection (e.g., via another structure or component).

Embodiments of the disclosure relate to mobile computers that are equipped with first near-field (NFC) communication antennas oriented in at least two directions. A first NFC antenna may be disposed along a first plane of the mobile computer, such as the bottom plane of the housing. A second NFC antenna may be disposed along a second plane of the mobile computer, such as the front end of the housing where the scan engine is disposed with its scan area extending from the front end of the housing. Such mobile computers may be manufactured according to various form factors, such as a rectangular housing that rests in the user's hand or other housings that may have a separate grip for the user to hold. Other form factors may be wearable, such as being mountable on a user's wrist. Examples of form factors may include the Memor, Joya, Skorpio, and/or Falcon product lines available from Datalogic of Bologna, Italy. Other form factors and configurations are also contemplated, although for convenience a handheld mobile computer is used in the figures as an example of one type of device.

FIG. 1 is a mobile computer or device 100 according to an embodiment of the disclosure. The mobile computer 100 may including a housing 110 that is portable and configured for handheld operation by a user. The mobile computer 100 may include a touch screen 120 providing an interface for the user to operate and interact (e.g., via icons) with the device. The mobile computer 100 may also include a scan engine 130 configured to scan machine-readable indicia (e.g., ID barcodes, QR codes, etc.). The scan engine 130 may include one or more cameras, lenses, illumination sources, aimers, etc. that are electrically coupled to at least one processor that perform analyses (e.g., decoding, optical character recognition, object recognition, etc.) on the captured images. The scan engine 130 may be disposed within the mobile computer 100 such that its field-of-view may extend out of a scan window disposed on the front end (or elsewhere) of the housing 110.

Figure 2:
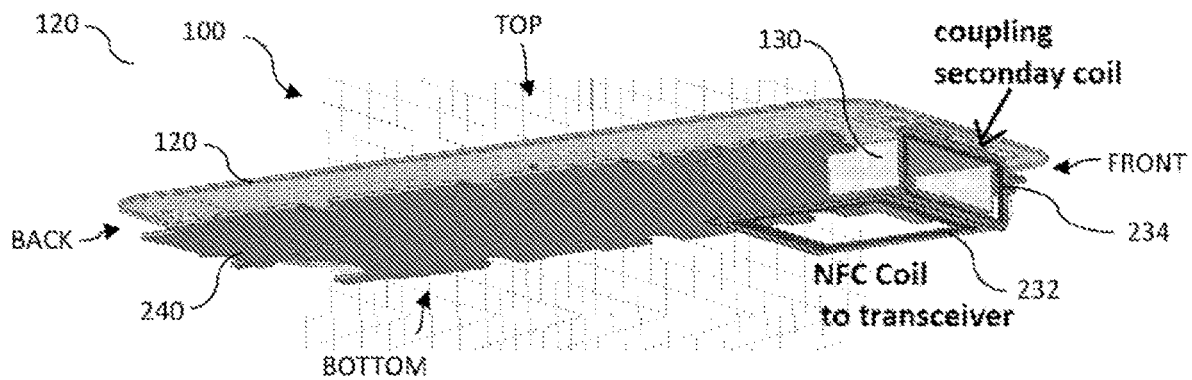
FIG. 2 shows a simplified view of internal components of the mobile computer having the housing removed.

FIG. 2 shows a simplified view of internal components of the mobile computer 100 having the housing 110 removed. The top, bottom, front, and back planes of the mobile computer 100 are labeled based on the orientation shown for convenience of description. Of course, the mobile computer 100 may be operable in any orientation when in use. Thus, these designations are used for distinguishing between components. In some embodiments, the front and back planes may be generally parallel to each other. For a rectangular-shaped body, the front/back planes may be generally orthogonal to the top/bottom planes. The mobile computer 100 is equipped with a first near-field (NFC) communication antenna 232 disposed within the housing 110 along its bottom plane, and a second near-field (NFC) communication antenna 234 disposed within the housing 110 along its front end. The first NFC antenna 232 may also be referred to as the "primary" antenna (i.e., coil) or "main" antenna, while the second NFC antenna 234 may also be referred to as the "secondary" antenna (i.e., coil), the "booster" antenna, the "extender" antenna, and/or the "range extender" antenna. It should also be understood that either NFC antenna 232, 234 may be used to read a payment card (e.g., credit card, debit card, prepaid card, etc.) for payment processing. The terms "antenna" and "coil" may also be used interchangeably herein.

The main antenna 232 is connected to an NFC transceiver circuit (not shown) on the main printed circuit board (PCB) 240 where other system components (e.g., system processor) are also mounted. The secondary booster antenna 234 is coupled to tuning capacitors placed on its own flexible PCB (as a flexible printed circuit (FPC)) (see, for example, FIG. 6B) that is separate and not connected the main PCB 240. The booster antenna 234 may be wirelessly coupled to the main NFC antenna 232, therefore is not driven directly by RF power. Rather, the booster antenna 234 is powered in a wireless manner by being electromagnetically coupled (e.g., via close proximity), as opposed to being physically or electrically coupled, to the main NFC antenna 232. The periphery of the secondary booster antenna 234 may extend around the front of the scan engine 130, such as around the periphery of the scan window in a manner that does not block the field-of-view of the imagers of the scan engine 130.

In some embodiments, the secondary NFC booster antenna 234 may be secured (e.g., via a FPC) to an internal side of the scan engine 130 glass in a manner that is not visible to the user from the outside. In some embodiments, the FPC of the secondary NFC booster antenna 234 may be integrated close to the scan engine rubber boot, such that the secondary NFC booster antenna 234 may be bent having L shape or U shape around the scan engine 130. The secondary NFC booster antenna 234 may not be secured directly to contact the scan engine 130 in embodiments where the scan engine 130 has a metal shield. In some embodiments, the metal shield of the scan engine 130 may be covered by a thin rubber boot as a spacer for the secondary NFC booster antenna 234. In some embodiments, the FPC for the secondary NFC booster antenna 234 may be integrated (e.g., molded) inside an external plastic device rubber boot for the mobile computer 100. In this case, the extender coil may be positioned in a way to enable coupling to the main NFC antenna 232 connected to the NFC transceiver on the main PCB 120.

Figure 3A:
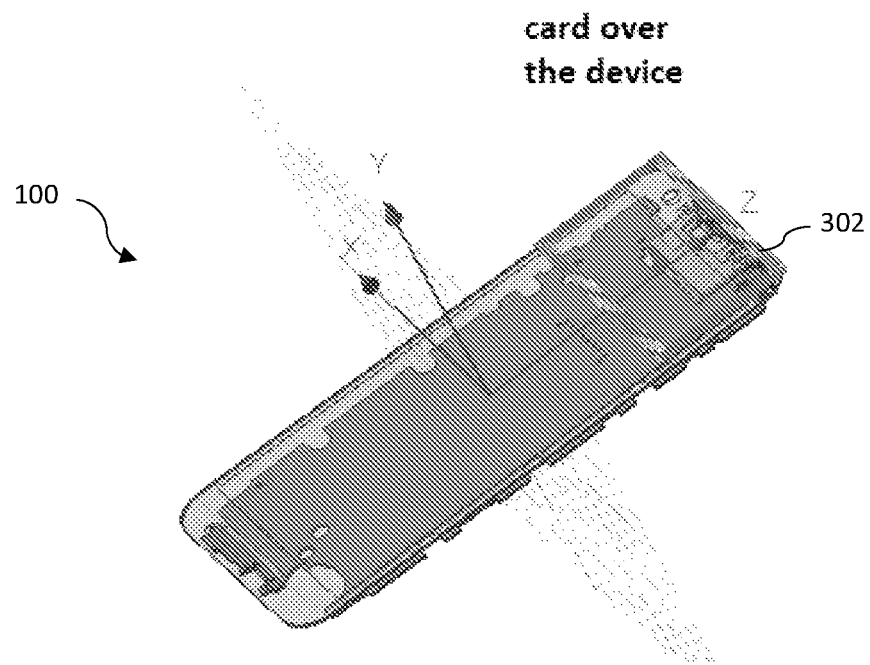
FIGS. 3A-3B show examples of the mobile device being used to read an NFC-enabled card.
Figure 3B:
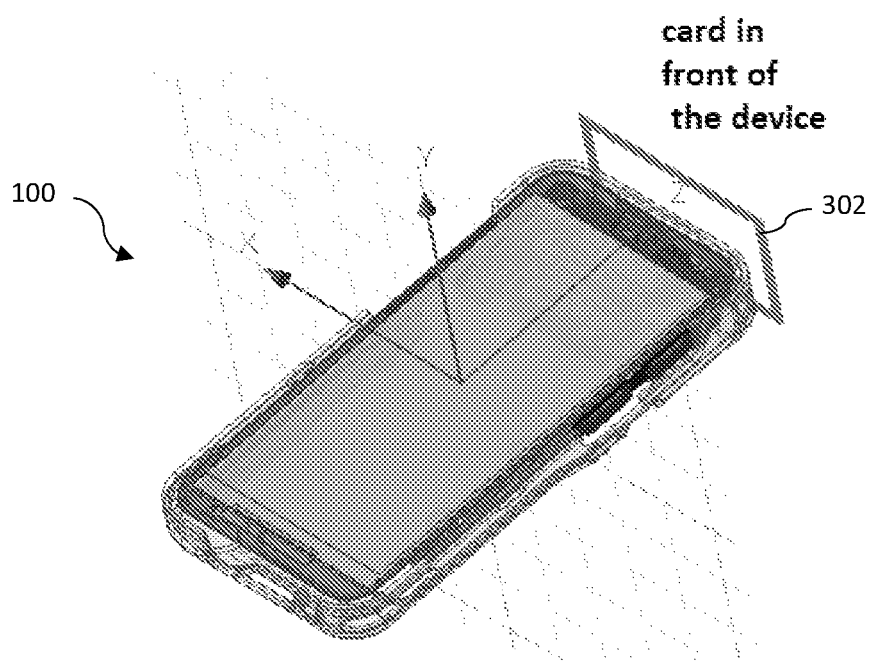

FIGS. 3A-3B show examples of the mobile computer 100 being used to read an NFC-enabled card, such as a payment card (e.g., credit card, debit card, etc.) or other similar card or devices that may be equipped to communicate with an NFC reader. The presence of the main antenna 232 (see FIG. 2) may enable card reading when a card 302 is placed over the mobile computer (see FIG. 3A), such as parallel to the top or bottom planes. The presence of the secondary booster antenna 234 (see FIG. 2) may enable card reading when a card 302 is placed in front of the mobile computer 100 (see FIG. 3B). Thus, NFC performance may be boosted in order to detect cards in multiple planes. By coupling wirelessly with the main NFC antenna 232, a less complex solution may be achieved in comparison to an embodiment where the secondary booster antenna 234 is coupled directly to the NFC transceiver. The secondary NFC antenna 234 may be a standalone coil plus tuning capacitors that is implemented on its own PCB or FPC in order to facilitate the possibility to bend the coil itself. In operation, the secondary NFC antenna 234 may redirect part of the electromagnetic field generated from the main NFC antenna 232 to a field on the front side of the mobile computer 100. The main NFC antenna 232 may be powered with an RF signal for NFC communication (e.g., 13.56 MHZ). The secondary NFC antenna 234 may be tuned with one or more capacitors, and may not be physically and/or electrically connected to the main NFC antenna 232 or any other electronic part, but may be electromechanically coupled with the main NFC antenna 232.

Figure 4A:
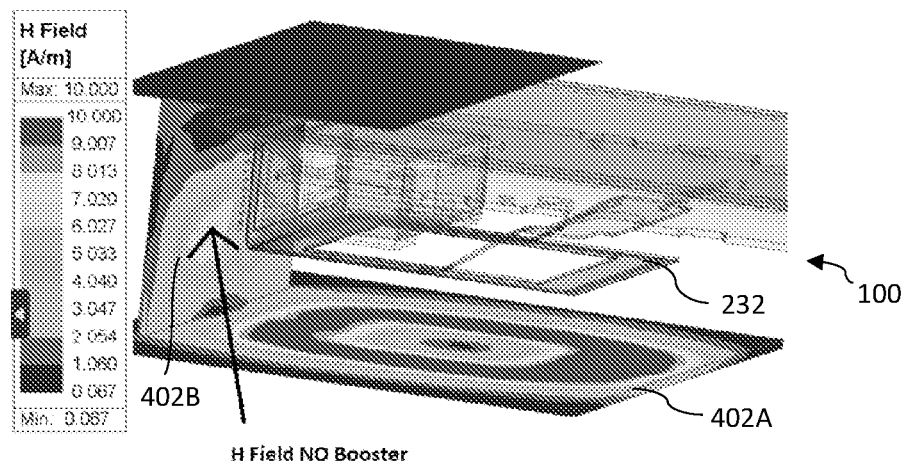
FIG. 4A is a simulated plot of the electromagnetic field generated by a mobile computer having only a main NFC antenna.
Figure 4B:
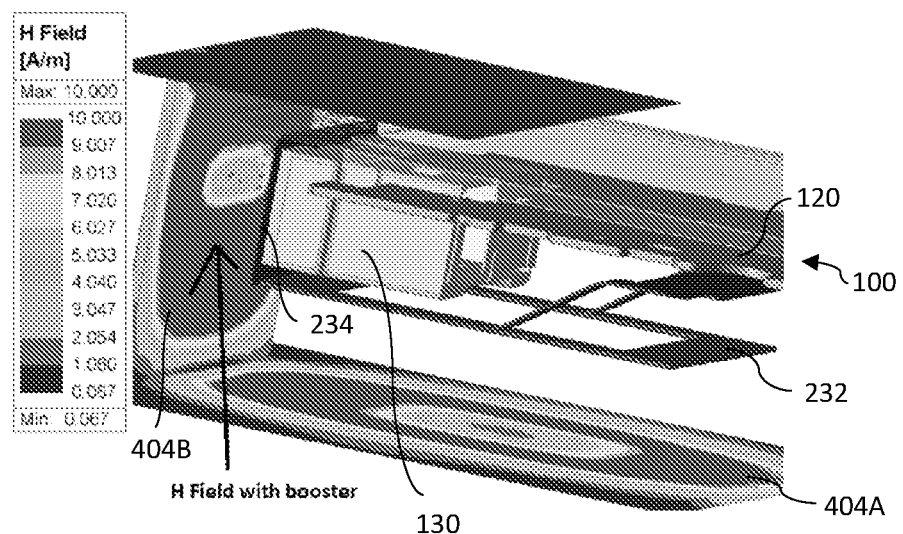
FIG. 4B is a simulated plot of the electromagnetic field generated by a mobile computer having both a main NFC antenna and the secondary NFC antenna.

FIG. 4A is a simulated plot of an electromagnetic field (with regions 402A, 402B) generated by the mobile computer 100 having only a main NFC antenna 232 (see FIG. 2), while FIG. 4B is a simulated plot of the electromagnetic field (with regions 404A, 404B) generated by a mobile computer 100 having both a main NFC antenna 232 and the secondary NFC antenna 234. As shown, the H Field intensity in the region 404B in front of the mobile computer 100 is greater in FIG. 4B (with booster secondary NFC antenna 234) than the region 402B in front of the mobile computer 100 in FIG. 4A (without a secondary NFC antenna). As a result, the NFC read range may be improved for the mobile computer 100 in the embodiment of FIG. 4B relative to the NFC read range for the mobile computer 100 in the embodiment of FIG. 4A, particularly in front of the device. The H Field in intensity in the region 402A below the mobile computer 100 in FIG. 4B (with booster secondary NFC antenna 234) is at a substantially same level as the region 404A below the mobile computer 100 in FIG. 4A (without a secondary NFC antenna).

FIG. 5A is a table 500A showing an illustrative read range for various NFC cards when placed in front (e.g., parallel orientation to scan engine glass) of a mobile computer device having a primary NFC antenna without a secondary NFC antenna (left column) vs. in front of a mobile computer device having both a primary NFC antenna and a secondary NFC antenna (right column). Thus, the presence of the secondary NFC antenna may substantially improve the read range in the area in front of the mobile computer device.

FIG. 5B is a table 500B showing an illustrative read range for various NFC cards when placed in below the underside of a mobile computer device having a primary NFC antenna without a secondary NFC antenna (left column) vs. below the underside of a mobile computer device having both a primary NFC antenna and a secondary NFC antenna (right column). Thus, the presence of the secondary NFC antenna does not substantially degrade the read range in this direction.

Figure 6A:
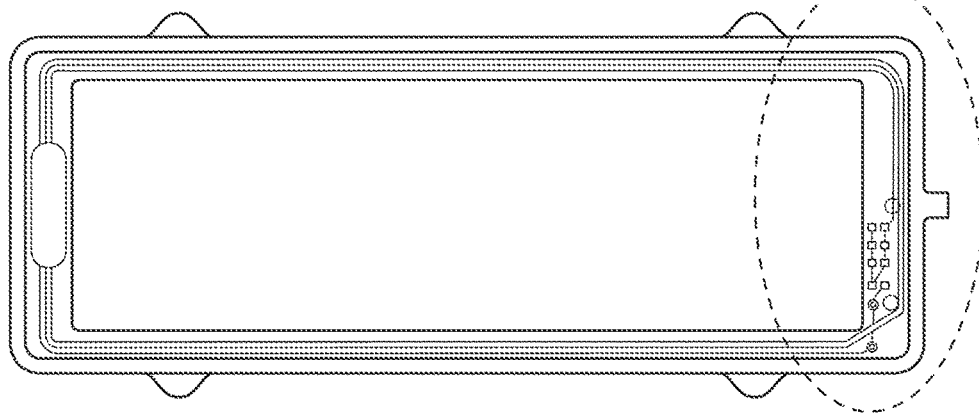
FIGS. 6A-6C are various representations of a construction of the secondary NFC antenna according to an embodiment of the disclosure.
Figure 6B:
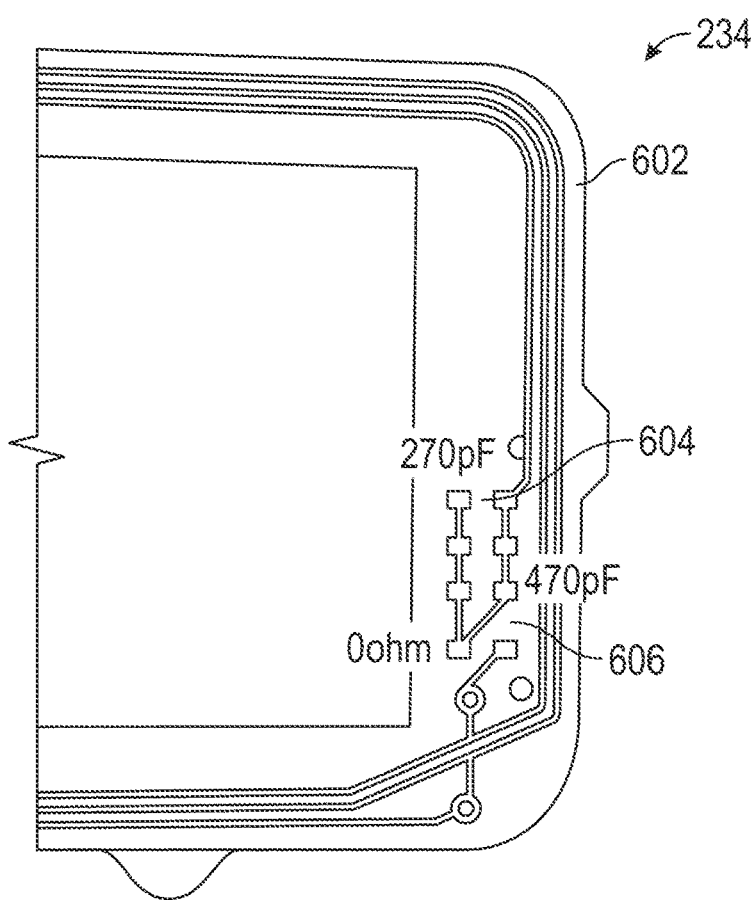
Figure 6C:
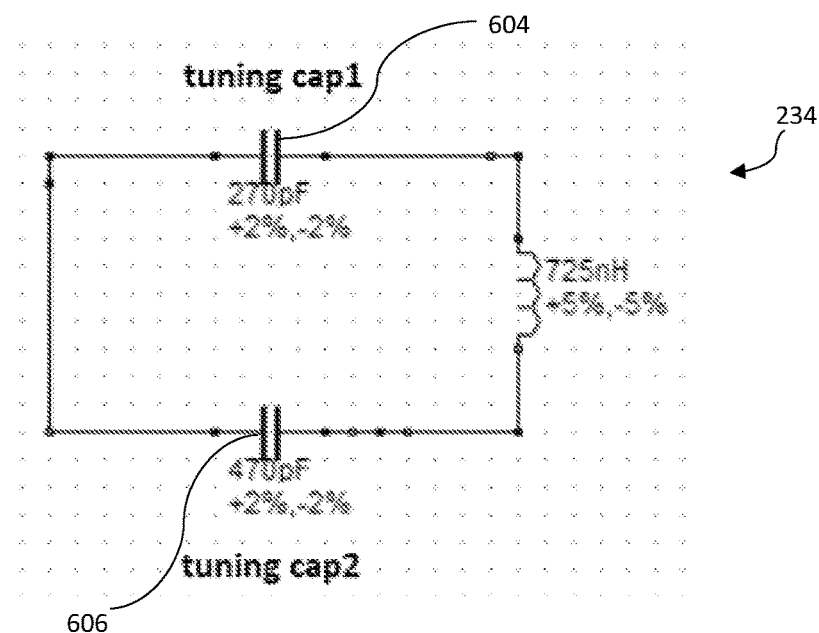

FIGS. 6A-6C are various representations of a construction of the secondary NFC antenna 234 (see also FIG. 2) according to an embodiment of the disclosure. In particular, FIG. 6B is a zoomed in view of the indication portion of the secondary NFC antenna 234 of FIG. 6A. FIG. 6C is a schematic representation of the secondary NFC coil 234. In this example, the secondary NFC antenna 234 may be constructed in or on a flex PCB 602 with tuning capacitors 604, 606. It should be understood that an alternative number and/or arrangement of tuning capacitors may be utilized. The tuning capacitors 604, 606 may be soldered or otherwise connected to the antenna. The secondary NFC antenna 234 can be disposed in a mobile computer device, such as, for example, embedded in the scanner glass material, adhered to the scanner glass material, embedded in a rubber boot material, embedded in a plastic casing, adhered to the plastic casing, or at other locations as described herein. The capacitance values of the tuning capacitors 604, 606 may be selected in conjunction with an inductor or coil having a coil inductance to achieve a desired resonant frequency. In some embodiments, the secondary NFC antenna 234 may be tuned at a different resonant frequency than the main NFC coil 232 so as to not detune the main NFC antenna 232. For example, the main NFC antenna 232 may be tuned at a resonant frequency of approximately 13.56 MHZ (e.g., NFC carrier frequency transmitter), and the secondary NFC antenna 234 may be tuned at a resonant frequency within a range of 13.9 MHz and 14.6 MHz. In some embodiments, the secondary NFC antenna 234 may be approximately 14.30 MHZ. Alternative values of the capacitors 604 and 606 and inductor may be utilized in accordance with the principles provided herein.

In some embodiments, tuning the secondary NFC antenna 234 may be achieved without such tuning capacitors. For example, the secondary NFC antenna 234 may be tuned by adding more turns in the coil design, resulting in more inductance. In some embodiments, the secondary NFC antenna 234 may be tuned by adding metal plates to the coil in order to build capacitance. Effectively the capacitance value that the NFC antenna 234 is possible to achieve can be calculated once the overlapping metal copper plated dimension (W, L), the separation distance (D) and the Er dielectric constant of the material are known between the 2 overlapped metal plates. By removing tuning capacitors in the design, the cost of the secondary NFC antenna 232 may be reduced.

Figure 7:
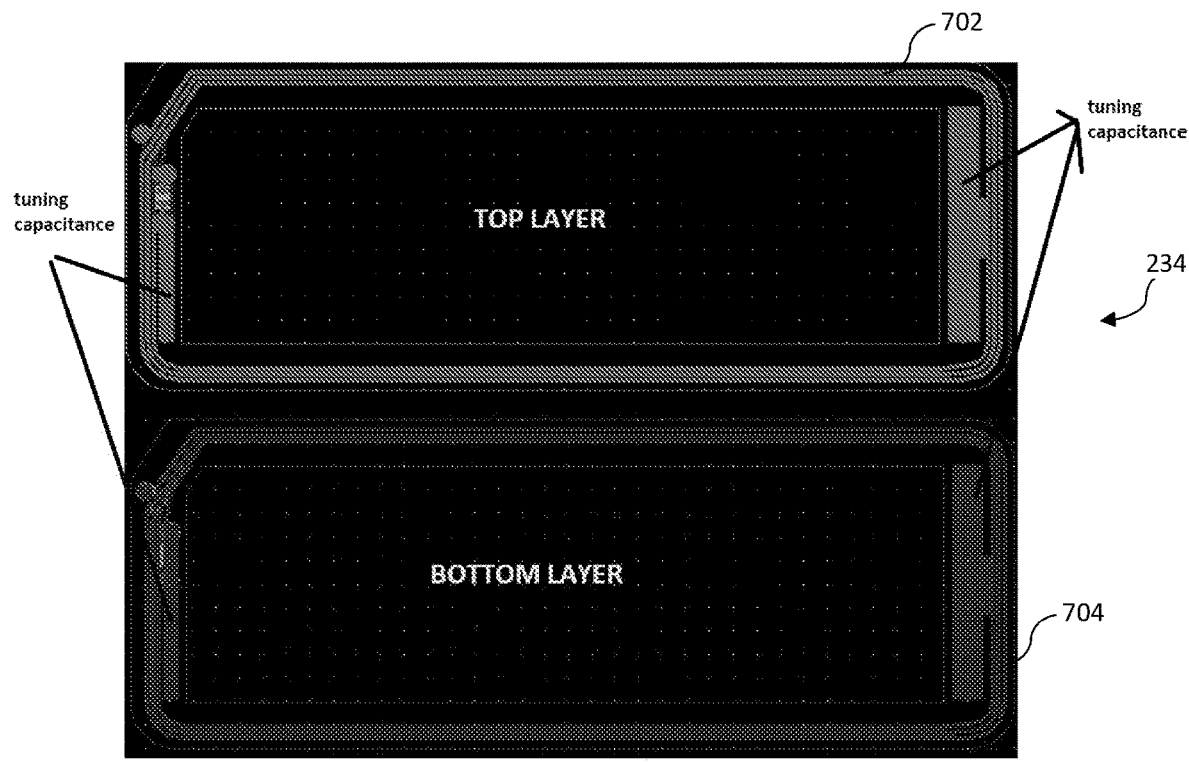
FIG. 7 shows different metal layers of construction for the secondary NFC antenna according to embodiments of the disclosure.

FIG. 7 shows different metal layers of construction for the secondary NFC antenna 234 according to embodiments of the disclosure. The secondary NFC antenna 234 may include a top metal layer 702 and a bottom metal layer 704 that are overlapping to form a capacitor (e.g., two plates overlapped). When tuning the secondary NFC antenna 234, the target resonant frequency may be defined and the coil inductance and the coil self-capacitance may be determined, thereby enabling a determination of what additional capacitance may be utilized to achieve the target resonant frequency to determine dimensions of the metal plates. As a results, the secondary NFC antenna 234 may be tuned to a target resonant frequency without separate tuning capacitors, which may provide for a lower cost solution that is dependent on the cost of the FPC.

Figure 8A:
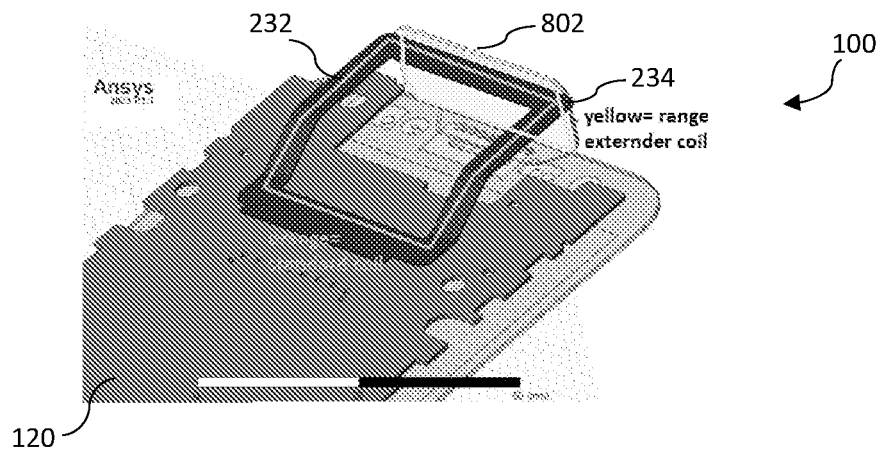
FIGS. 8A-8B are additional simplified views of a mobile computer device including a primary NFC antenna and a secondary NFC antenna according to embodiments of the disclosure.
Figure 8B:
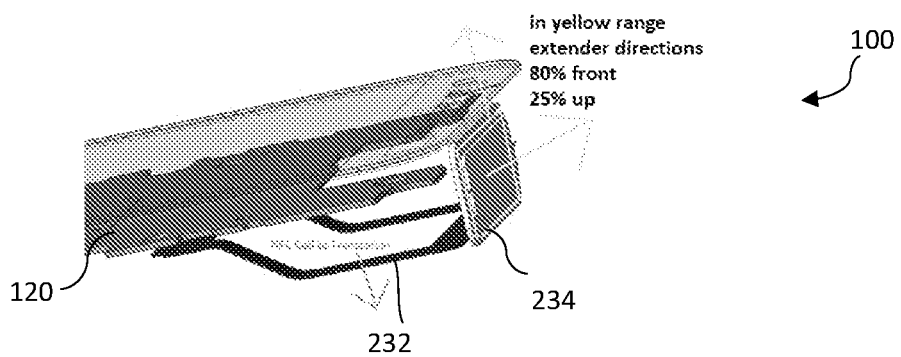

FIGS. 8A-8B are additional simplified views of a mobile computer 100 including the primary NFC antenna 232 (see also FIG. 2) and a secondary NFC antenna 234 according to embodiments of the disclosure. Components, such as the external housing, scan engine, etc. are not shown for simplicity in focusing on the NFC antennas 232, 234. FIG. 8A is a top perspective view of the mobile computer 100, and FIG. 8B is a side perspective view of the mobile computer 100. The coil for the primary NFC antenna 232 may be formed with a flexible PCB to be at least partially coextensive with the top of the scan engine and then bend to make contact with the PCB 120.

FIGS. 9-13 are various configurations of the secondary NFC antenna 234 (FIG. 2) being incorporated in a mobile computer 100 according to embodiments of the disclosure.

Figure 9:
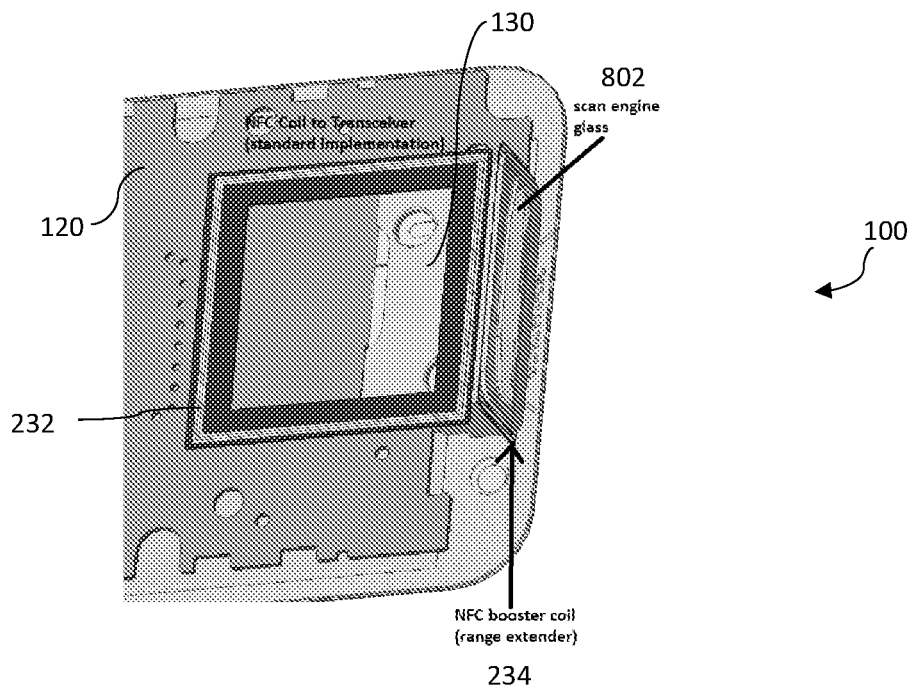
FIGS. 9-13 are various configurations of the secondary NFC antenna being incorporated in a mobile computer device according to embodiments of the disclosure.

FIG. 9 shows the secondary NFC antenna 234 being disposed between the exit window 802 (e.g., glass, plastic, or other transparent material) and the scan engine 130 of the mobile computer 100. In some embodiments, the secondary NFC antenna 234 may be adhered (e.g., glue, tape, etc.) or otherwise secured to the back side of the material of the exit window 802 and/or front side of the scan engine 130. The secondary NFC antenna 234 may not be visible to the user from the outside of the mobile computer 100. In some embodiments, an additional intermediate material (e.g., rubber) may be disposed between the secondary NFC antenna 234 and the scan engine 130 acting as a spacer to avoid direct contact.

Figure 10:
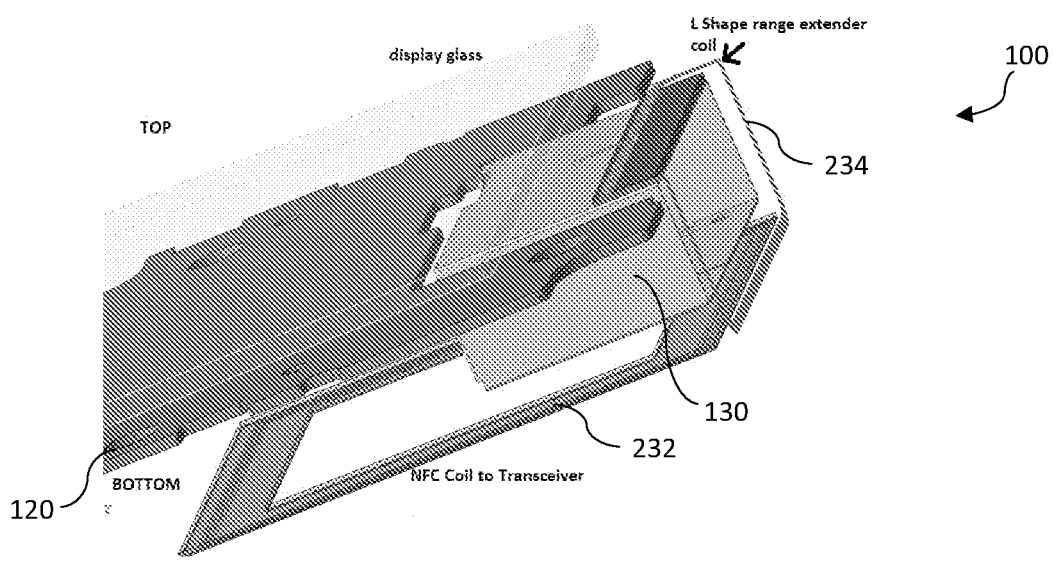

FIG. 10 also shows the secondary NFC antenna 234 being disposed between the exit window (not shown) and the scan engine 130 of the mobile computer 100. In this embodiment, the secondary NFC antenna 234 may be formed into a bent shape, such as an L-shape such that the secondary NFC antenna 234 (e.g., via an intermediate substrate, such as a rubber spacer material) may be adhered (e.g., glue, tape, etc.) or otherwise secured to a top side of the scan engine 130. The L-shaped secondary NFC antenna 234 may have a first portion that extends in a parallel plane as the primary NFC antenna 232, and a second portion that extends in a transverse plane to the primary NFC antenna 232. This second portion may extend in front of the front side of the scan engine 130 leaving an opening for the scan engine 130 around the periphery of the exit window 802 to allow for a field-of-view for the scan engine 130.

Figure 11:
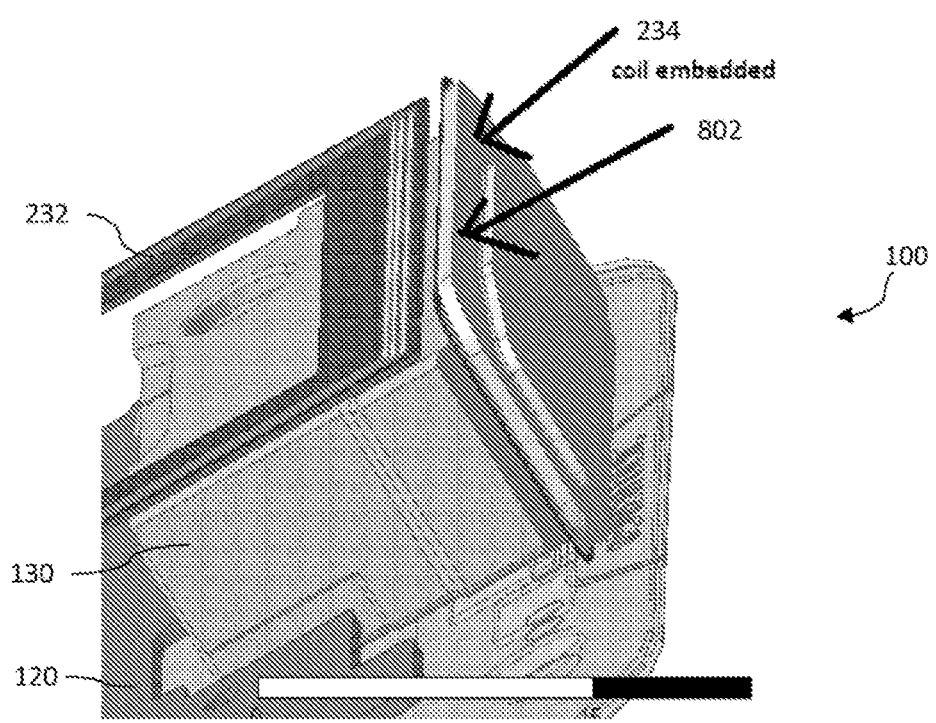

FIG. 11 shows the secondary NFC antenna 234 being disposed within (i.e., embedded) the material of exit window 802 (e.g., glass, plastic, or other transparent material). The periphery of the secondary NFC antenna 234 may extend around the periphery of the exit window 802 leaving an opening for the scan engine 130 to allow for a field-of-view for the scan engine 130.

Figure 12:
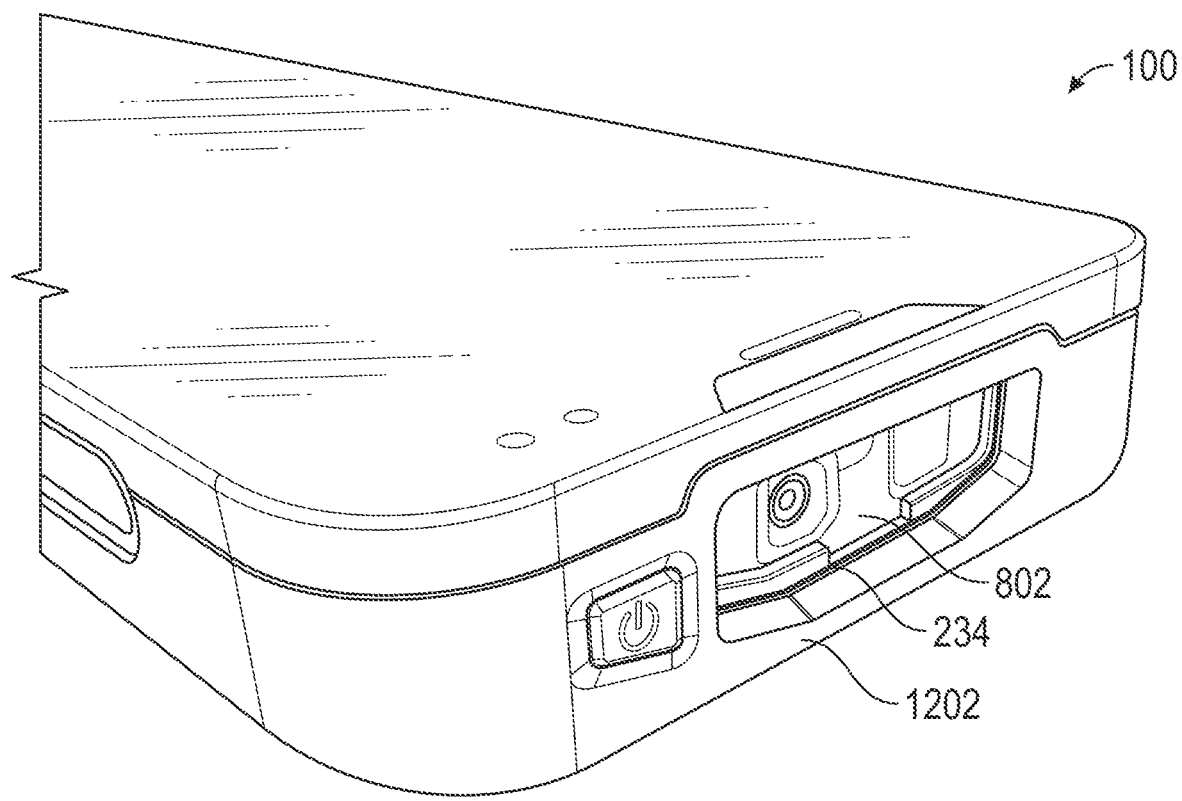

FIG. 12 shows the secondary NFC antenna 234 being disposed between the exit window 802 (e.g., glass, plastic, or other transparent material) and the external housing 1202 of the mobile computer 100. In some embodiments, the external housing 1202 may be formed from a rugged plastic material to provide the form factor for the mobile computer 100 and to protect internal components. In some embodiments, the secondary NFC antenna 234 may be adhered (e.g., glue, tape, etc.) or otherwise secured to the front side of the material of the exit window 802 and/or internally facing side of the external housing 1202.

Figure 13:
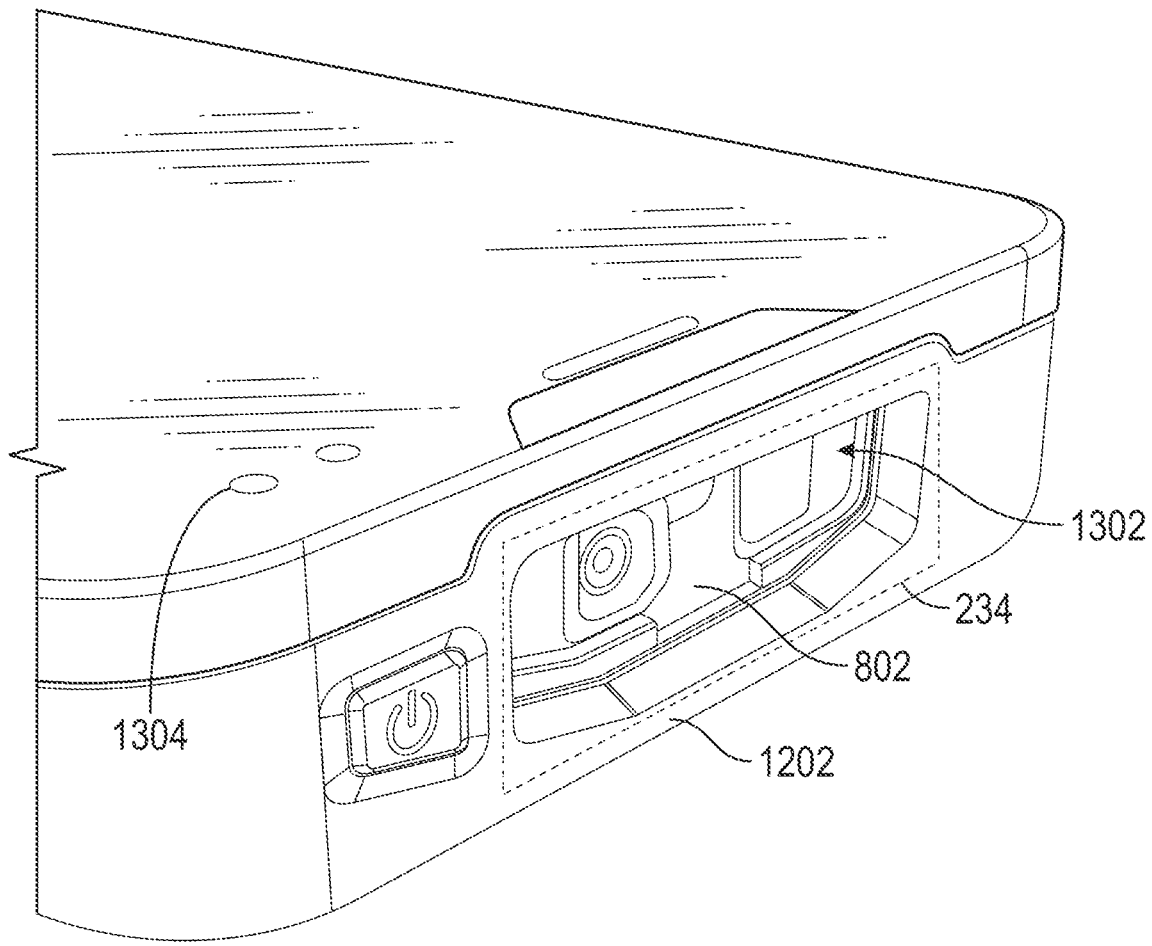
Figure 14A:
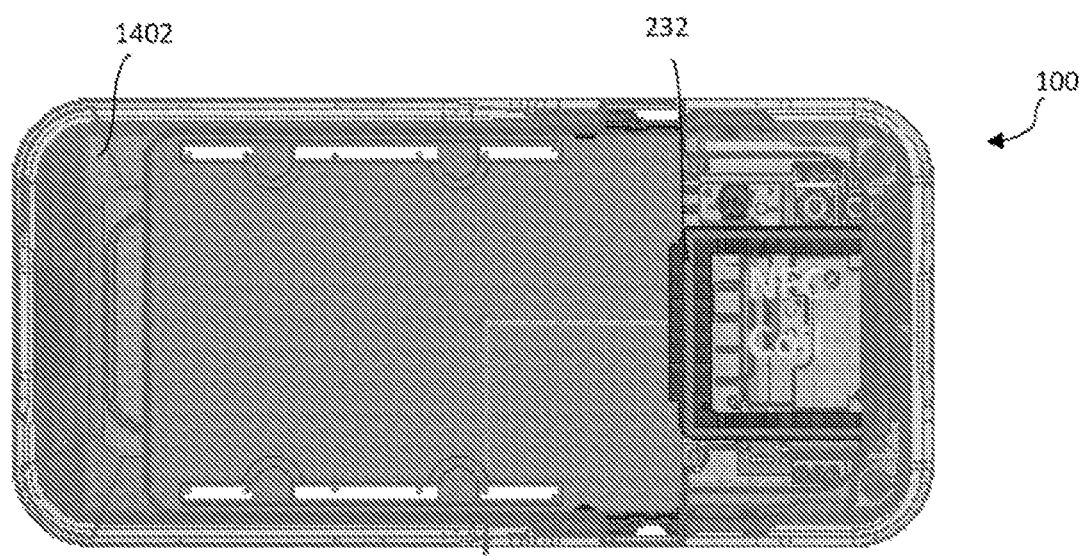
FIGS. 14A-14D show the mobile computer device having a detachable protective case having the secondary NFC antenna disposed therein according to embodiments of the disclosure.
Figure 14B:
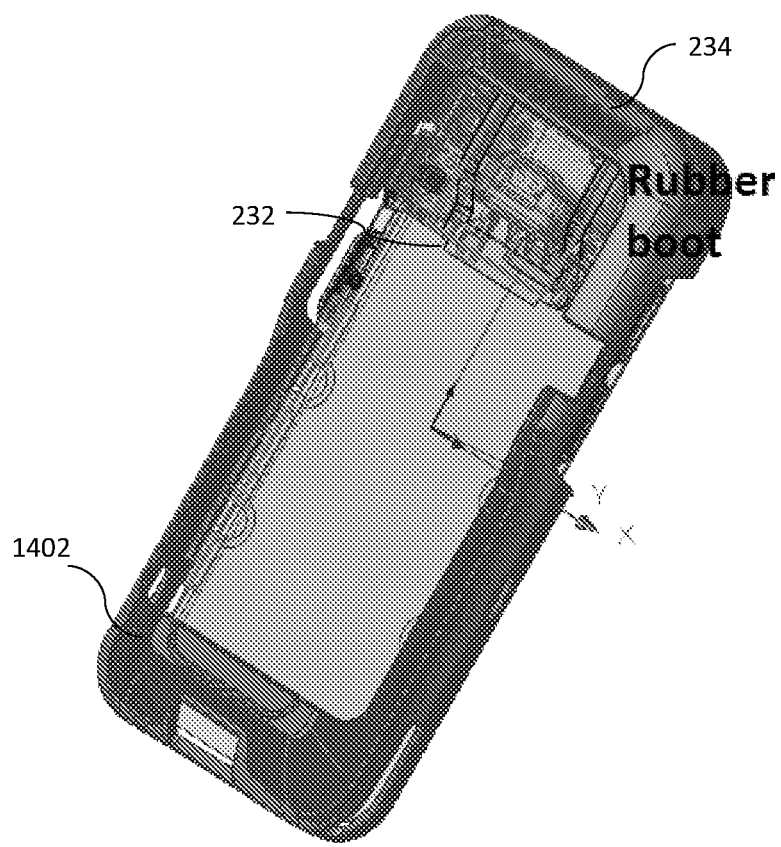
Figure 14C:
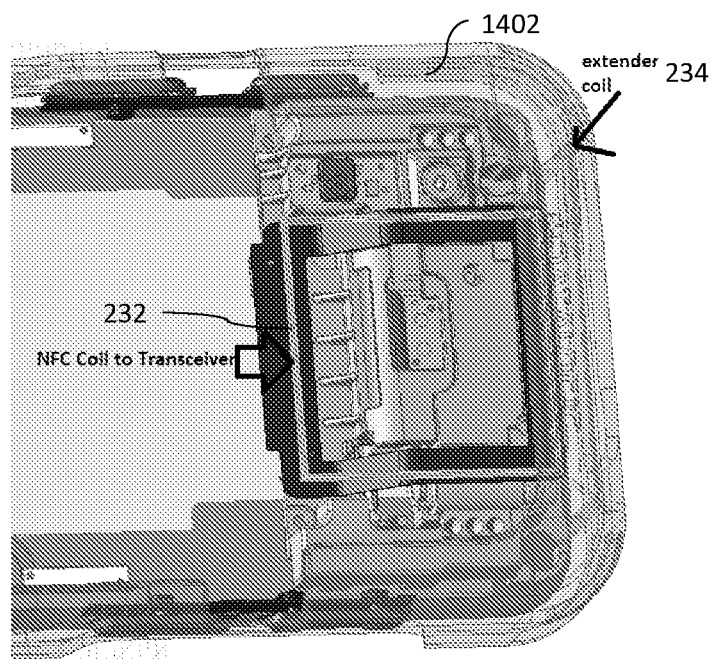
Figure 14D:
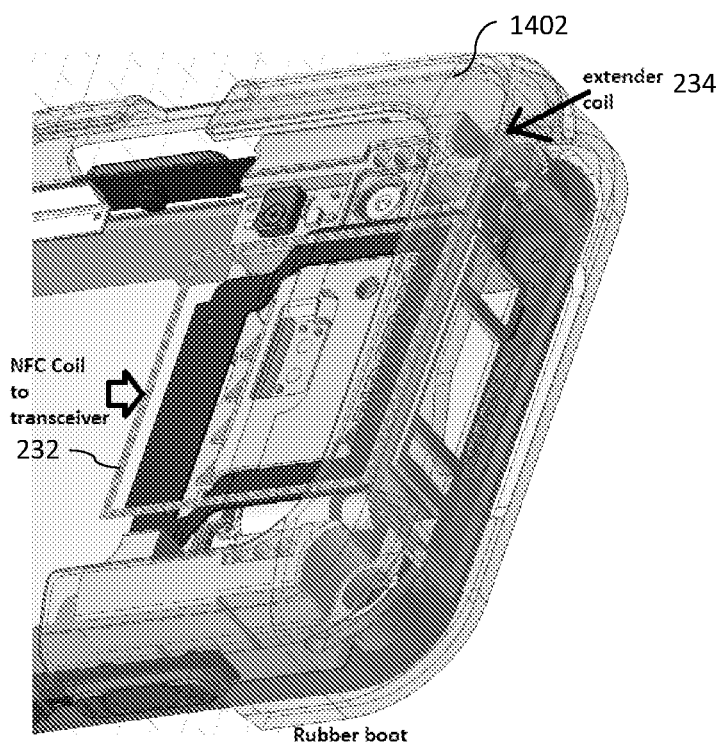

FIG. 13 shows the secondary NFC antenna 234 being disposed within (i.e., embedded) the molded material (e.g., plastic) of external housing 1202. The periphery of the secondary NFC antenna 234 may extend around the periphery of the portion of the external housing that provides an opening for the scan engine 130 to allow for a field-of-view for the scan engine 130.

In some embodiments, the mobile computer 100 may further include an indicator light 1302 configured to indicate to a user where to place the NFC enabled device for reading. The indicator light 1302 may include an LED disposed within the scan engine 130 (e.g., next to the imagers) that may illuminate through the exit window to be visible by the user from the front perspective of the mobile computer 100. The mobile computer 100 may also include another indicator light 1304 that may be disposed within the housing to illuminate through the housing to be visible by the user from the top perspective of the mobile computer 100.

One or both indicator lights 1302, 1304 may be active when the processor is ready for NFC reading, such as when customer payment is ready to be received during a transaction. For example, the indicator lights 1302, 1304 may produce a flashing green light indicating to the user that payment is ready, as well as indicating where the payment card (or other NFC device) should be presented for improving placement within the reading fields of the NFC antennas 232, 234.

FIGS. 14A-14D show the mobile computer 100 (see also FIG. 1) having a detachable protective case 1402 having the secondary NFC antenna 234 disposed therein according to embodiments of the disclosure. The external housing is not shown in FIGS. 14A-14D for simplicity and the protective case 1402 is made transparent in order to focus the discussion on the NFC antennas 232, 234. The secondary NFC antenna 234 may be integrated (e.g., molded, embedded, etc.) inside the material forming the protective device 1402 at the front end surrounding the opening for the scan engine 130 to allow for a field-of-view for the scan engine 130. This placement also enables coupling with the primary NFC antenna 232 to extend the range of the NFC field in the front area of the mobile computer 100.

The protective case 1402 may be added to the external housing to provide additional protection in case of being dropped or other contact. In some embodiments, the protective case 1402 may extend fully around the entire back side of the mobile computer 100, while in some embodiments, the protective case 1402 may extend around portions (e.g., corners), but not around other portions of the external housing of the mobile computer 100.

The secondary NFC antenna 234 embedded within the detachable protective case 1402 may be configured similarly as described above in other embodiments. For example, the secondary NFC antenna 234 may be configured in an L-shape, a loop shape, or other shape as desired for a particular application. The secondary NFC antenna 234 embedded within the detachable protective case 1402 may also include one or more tuning capacitors that are used to define a target resonant frequency and/or overlapping metal plates forming a distributed capacitor for tuning the secondary NFC coil to a defined target resonant frequency. The resonant frequency of such a secondary NFC coil 234 may be different than the primary NFC coil as described above.

Additional non-limiting embodiments include:

Embodiment 1. A mobile barcode reader, comprising: a housing having a defined exit window; a scan engine positioned within a front portion of the housing with one or more imagers having a field-of-view extending out of the exit window, the scan engine configured to read barcodes; a primary NFC antenna disposed in a first plane extending in a longitudinal direction of the housing, the primary NFC antenna operably coupled with electronics of the mobile barcode reader to facilitate NFC reading; and a secondary NFC antenna disposed proximate the front portion and extending in a second plane that is transverse to the longitudinal of the housing, the secondary NFC antenna configured as a boosting antenna for the primary NFC antenna without being electrically coupled with the electronics of the mobile barcode reader.

Embodiment 2. The mobile barcode reader of Embodiment 1, wherein the primary NFC antenna and the secondary NFC antenna are orthogonal to each other.

Embodiment 3. The mobile barcode reader of Embodiment 1 or Embodiment 2, wherein the secondary NFC antenna extends around the exit window without being visible to the user from the outside of the housing.

Embodiment 4. The mobile barcode reader of Embodiment 1 or Embodiment 2, wherein the secondary NFC antenna is embedded within a material forming the housing.

Embodiment 5. The mobile barcode reader of Embodiment 1 or Embodiment 2, wherein the secondary NFC antenna is disposed between the housing and the scan engine.

Embodiment 6. The mobile barcode reader of Embodiment 1 or Embodiment 2, wherein the secondary NFC antenna is disposed between the housing and a material forming the exit window.

Embodiment 7. The mobile barcode reader of Embodiment 1 or Embodiment 2, wherein the secondary NFC antenna is disposed between a material forming the exit window and the scan engine.

Embodiment 8. The mobile barcode reader of Embodiment 1 or Embodiment 2, wherein the secondary NFC antenna configured in an L shape within one end coupled to a top portion of the scan engine, and another end extending in downward relative to a front portion of the scan engine.

Embodiment 9. The mobile barcode reader of Embodiment 8, wherein the secondary NFC antenna is coupled to the top portion of the scan engine via a rubber spacing material.

Embodiment 10. The mobile barcode reader of Embodiment 1 or Embodiment 2, wherein the secondary NFC antenna is embedded within a material forming the exit window.

Embodiment 11. The mobile barcode reader of any of Embodiments 1 through 10, wherein the secondary NFC coil includes one or more tuning capacitors to define a target resonant frequency.

Embodiment 12. The mobile barcode reader of any of Embodiments 1 through 10, wherein the secondary NFC coil includes overlapping metal plates forming a distributed capacitor for tuning the secondary NFC coil to a defined target resonant frequency.

Embodiment 13. The mobile barcode reader of any of Embodiments 1 through 12, wherein the primary NFC coil has a first resonant frequency, and the secondary NFC coil has a second resonant frequency that is different than the first resonant frequency.

Embodiment 14. The mobile barcode reader of Embodiment 13, wherein the first resonant frequency is approximately the same frequency as a carrier frequency for an NFC transmitter.

Embodiment 15. The mobile barcode reader of Embodiment 13 or Embodiment 14, wherein the first resonant frequency is approximately 13.56 MHZ, and the second resonant frequency is within a range between 13.9 MHz and 14.6 MHZ.

Embodiment 16. The mobile barcode reader of Embodiment 1 or Embodiment 2 or Embodiment 8 or Embodiments 11 through 15, further comprising a detachable protective case configured to receive the housing to protect the integrity thereof, wherein the secondary NFC antenna is embedded in a material of the detachable protective case around an aperture thereof that aligns with the exit window.

Embodiment 17. A method of manufacturing a mobile barcode reader, the method comprising: forming a housing having a defined exit window; disposing a scan engine within a front portion of the housing with one or more imagers having a field-of-view extending out of the exit window, the scan engine configured to read barcodes; disposing a primary NFC antenna in a first plane extending in a longitudinal direction of the housing, the primary NFC antenna operably coupled with electronics of the mobile barcode reader to facilitate NFC reading; and disposing a secondary NFC antenna disposed proximate the front portion and extending in a second plane that is transverse to the longitudinal of the housing, the secondary NFC antenna configured as a boosting antenna for the primary NFC antenna without being electrically coupled with the electronics of the mobile barcode reader.

Embodiment 18. The method of Embodiment 12, wherein disposing the secondary NFC antenna includes securing the secondary NFC antenna to the exit window and/or the scan engine via an adhesive material.

Embodiment 19. A method of operating a mobile barcode reader, the method comprising: operating a scan engine positioned within a front portion of the housing with one or more imagers having a field-of-view extending out of an exit window of the mobile barcode reader, the scan engine configured to read barcodes; activating a primary NFC antenna disposed in a first plane extending in a longitudinal direction of the housing, the primary NFC antenna operably coupled with electronics of the mobile barcode reader to facilitate NFC reading; and activating a secondary NFC antenna disposed proximate the front portion and extending in a second plane that is transverse to the longitudinal of the housing, the secondary NFC antenna configured as a boosting antenna for the primary NFC antenna without being electrically coupled with the electronics of the mobile barcode reader.

Embodiment 20. The method of Embodiment 19, further comprising activating an indicator light incorporated within the scan engine responsive to the mobile device being ready to receive payment for a transaction, the indicator light indicating to a user where to place the NFC enabled device for reading.

The previous description is of various preferred embodiments for implementing the disclosure, and the scope of the invention should not necessarily be limited by this description. The scope of the present invention is instead defined by the claims.

What is claimed:
1. A mobile barcode reader, comprising:
a housing having a defined exit window;
a scan engine positioned within a front portion of the housing with one or more imagers having a field-of-view extending out of the exit window, the scan engine configured to read barcodes;
a primary NFC antenna disposed in a first plane extending in a longitudinal direction of the housing, the primary NFC antenna operably coupled with electronics of the mobile barcode reader to facilitate NFC reading; and
a secondary NFC antenna disposed proximate the front portion and extending in a second plane that is transverse to the longitudinal of the housing, the secondary NFC antenna configured as a boosting antenna for the primary NFC antenna without being electrically coupled with the electronics of the mobile barcode reader.

2. The mobile barcode reader of claim 1, wherein the primary NFC antenna and the secondary NFC antenna are orthogonal to each other.

3. The mobile barcode reader of claim 1, wherein the secondary NFC antenna extends around the exit window without being visible to the user from the outside of the housing.

4. The mobile barcode reader of claim 1, wherein the secondary NFC antenna is embedded within a material forming the housing.

5. The mobile barcode reader of claim 1, wherein the secondary NFC antenna is disposed between the housing and the scan engine.

6. The mobile barcode reader of claim 1, wherein the secondary NFC antenna is disposed between the housing and a material forming the exit window.

7. The mobile barcode reader of claim 1, wherein the secondary NFC antenna is disposed between a material forming the exit window and the scan engine.

8. The mobile barcode reader of claim 1, wherein the secondary NFC antenna configured in an L shape within one end coupled to a top portion of the scan engine, and another end extending in downward relative to a front portion of the scan engine.

9. The mobile barcode reader of claim 1, wherein the secondary NFC antenna is coupled to the top portion of the scan engine via a rubber spacing material.

10. The mobile barcode reader of claim 1, wherein the secondary NFC antenna is embedded within a material forming the exit window.

11. The mobile barcode reader of claim 1, wherein the secondary NFC coil includes one or more tuning capacitors to define a target resonant frequency.

12. The mobile barcode reader of claim 1, wherein the secondary NFC coil includes overlapping metal plates forming a distributed capacitor for tuning the secondary NFC coil to a defined target resonant frequency.

13. The mobile barcode reader of claim 1, wherein the primary NFC coil has a first resonant frequency, and the secondary NFC coil has a second resonant frequency that is different than the first resonant frequency.

14. The mobile barcode reader of claim 13, wherein the first resonant frequency is approximately the same frequency as a carrier frequency for an NFC transmitter.

15. The mobile barcode reader of claim 13, wherein the first resonant frequency is approximately 13.56 MHz, and the second resonant frequency is within a range between 13.9 MHz and 14.6 MHz.

16. The mobile barcode reader of claim 1, further comprising a detachable protective case configured to receive the housing to protect the integrity thereof, wherein the secondary NFC antenna is embedded in a material of the detachable protective case around an aperture thereof that aligns with the exit window.

17. A method of manufacturing a mobile barcode reader, the method comprising:

forming a housing having a defined exit window;

disposing a scan engine within a front portion of the housing with one or more imagers having a field-of-view extending out of the exit window, the scan engine configured to read barcodes;

disposing a primary NFC antenna in a first plane extending in a longitudinal direction of the housing, the primary NFC antenna operably coupled with electronics of the mobile barcode reader to facilitate NFC reading; and disposing a secondary NFC antenna disposed proximate the front portion and extending in a second plane that is transverse to the longitudinal of the housing, the secondary NFC antenna configured as a boosting antenna for the primary NFC antenna without being electrically coupled with the electronics of the mobile barcode reader.

18. The method of claim 17, wherein disposing the secondary NFC antenna includes securing the secondary NFC antenna to the exit window and/or the scan engine via an adhesive material.

19. A method of operating a mobile barcode reader, the method comprising:

operating a scan engine positioned within a front portion of the housing with one or more imagers having a field-of-view extending out of an exit window of the mobile barcode reader, the scan engine configured to read barcodes;

activating a primary NFC antenna disposed in a first plane extending in a longitudinal direction of the housing, the primary NFC antenna operably coupled with electronics of the mobile barcode reader to facilitate NFC reading; and activating a secondary NFC antenna disposed proximate the front portion and extending in a second plane that is transverse to the longitudinal of the housing, the secondary NFC antenna configured as a boosting antenna for the primary NFC antenna without being electrically coupled with the electronics of the mobile barcode reader.

20. The method of claim 19, further comprising activating an indicator light incorporated within the scan engine responsive to the mobile device being ready to receive payment for a transaction, the indicator light indicating to a user where to place the NFC enabled device for reading.

* * * * *